United States Patent
Gibson et al.

(10) Patent No.: US 8,139,343 B2
(45) Date of Patent: Mar. 20, 2012

(54) ELECTRICAL ENERGY STORAGE DEVICE CONTAINING AN ELECTROACTIVE SEPARATOR

(75) Inventors: Charles P. Gibson, Oshkosh, WI (US); Annamalai Karthikeyan, Oshkosh, WI (US)

(73) Assignee: WiSys Technology Foundation, Madison, WI (US)

( * ) Notice: Subject to any disclaimer, the term of this patent is extended or adjusted under 35 U.S.C. 154(b) by 0 days.

(21) Appl. No.: 13/041,808

(22) Filed: Mar. 7, 2011

(65) Prior Publication Data

US 2011/0157771 A1   Jun. 30, 2011

Related U.S. Application Data

(60) Provisional application No. 61/311,584, filed on Mar. 8, 2010, provisional application No. 61/366,599, filed on Jul. 21, 2010.

(51) Int. Cl.
*H01G 9/00* (2006.01)

(52) U.S. Cl. ........ 361/502; 361/503; 361/504; 361/509; 361/512; 361/523

(58) Field of Classification Search .......... 361/502, 361/504, 509–512, 523–529, 311–313, 321.2, 361/321.4, 503
See application file for complete search history.

(56) References Cited

U.S. PATENT DOCUMENTS

| 4,124,743 A | 11/1978 | Chireau et al. |
| 6,949,317 B2 * | 9/2005 | Yoshida et al. ............ 429/303 |
| 7,898,793 B2 * | 3/2011 | Ito et al. ................ 361/321.4 |
| 2009/0213529 A1 | 8/2009 | Gogotsi et al. |
| 2009/0325058 A1 | 12/2009 | Katayama |

FOREIGN PATENT DOCUMENTS

| EP | 1667254 A1 | 7/2006 |
| WO | WO 2006/127572 A2 | 11/2006 |
| WO | WO 2008/018657 A1 | 2/2008 |
| WO | WO 2010/024328 A1 | 3/2010 |

OTHER PUBLICATIONS

Battelle—Battelle Supercapacitor Holds Promise for Energy Storage available at http://www.battelle.org/spotlight/2-22-2010super.aspx.
The National Science Foundation: Supercapacitors Could be Key to a Green Energy Future available at http://www.nsf.gov/discoveries/disc_summ.jsp?cntn_id=111835.
Shanghai Green Tech Co., LTD: New Energy Storage Device available at http://www.greentechee.com/news.asp?id=218 4.
Barber, Peter, et al., Polymer Composite and Nanocomposite Dielectric Materials for Pulse Power Energy Storage, 2009, 2, pp. 1697-1733, Materials, MDPI AG, Basel, Switzerland.

(Continued)

*Primary Examiner* — Nguyen T Ha
(74) *Attorney, Agent, or Firm* — Boyle Fredrickson, S.C.

(57) ABSTRACT

An electrical energy storage device includes a first electrode; a second electrode; a separator; and an electrolyte; where the separator is an electronic insulator; the separator is positioned between the first and second electrodes; the separator includes a first surface proximal to the first electrode and a second surface proximal to the second electrode; the separator is configured to support an electric double layer at the first surface, the second surface, or at both the first surface and the second surface; and the device is an electrical energy storage device.

17 Claims, 7 Drawing Sheets

OTHER PUBLICATIONS

El Kamel, F., Electrical Properties of Amorphous Barium Titanate Films Sputter Deposited Under Hydrogen Containing Atmosphere, B27(1), Jan./Feb. 2009, pp. 373-377, Journal of Vacuum Science Technology, American Vacuum Society, New York, NY, USA.

Kim, Philseok, et al., Phosphonic Acid-Modified Barium Titanate Polymer Nanocomposites with High Permittivity and Dielectric Strength, 2007, 19, pp. 1001-1005, Advanced Materials, Wiley VCH Verlag GmbH & Co, Weinheim, Germany.

Wang, Sea-Fue, et al., Characteristics of Polymide/Barium Titanate Composite Films, 35 (2009) 265-268, Ceramics International, Elsevier, Amsterdam, The Netherlands.

Sedlmaier, Stefan, PCT International Search Report and Written Opinion of the International Searching Authority for PCT Application No. PCT/US2011/027467, mailed Jun. 14, 2011, European Patent Office, HV Rijswijk, The Netherlands.

* cited by examiner

400

410  415
420

ELECTRICAL ENERGY STORAGE DEVICE CONTAINING AN ELECTROACTIVE SEPARATOR

CROSS-REFERENCE TO RELATED APPLICATIONS

This application claims the benefit of U.S. Provisional Patent Application No. 61/311,584, filed Mar. 8, 2010, and U.S. Provisional Patent Application No. 61/366,599, filed Jul. 21, 2010 each which is incorporated herein by reference in its entirety for any and all purposes.

STATEMENT REGARDING FEDERALLY SPONSORED RESEARCH OR DEVELOPMENT

This invention was made with government support under 0930029 awarded by the National Science Foundation. The government has certain rights in the invention.

FIELD

The present technology generally relates to a new separator for energy storage devices such as capacitors, ultracapacitors, pseudocapacitors, batteries and ultracapacitor-battery hybrids.

BACKGROUND

The combustion of fossil fuels accounts for approximately 80% of the 11,000 mtoe (million tonne oil equivalent) of energy produced world-wide. This results in the production of huge quantities of pollutants, most notably carbon dioxide and other gases that are thought to be the primary contributors to global warming. Concerns about the environmental consequences of fossil fuel combustion are partly responsible for government mandates in the United States and in Europe, which will require manufacturers of passenger vehicles to produce "greener" vehicles that offer better mileage and lower emissions relative to current levels. Manufacturers are working to accomplish this is by offering vehicles that use start-stop technology, and by developing hybrid-electric or all-electric vehicles. Electrical energy storage (EES) devices such as batteries and ultracapacitors are key components for these "green-vehicle" technologies.

Unfortunately, the performance of current EES technologies falls far short of requirements for use in high-efficiency passenger vehicles. For example, batteries have relatively low power density, take a long time to recharge, and have limited cycle-life, and the present ultracapacitors have low energy density. Significant improvements to EES technologies will be required if high-efficiency vehicles are to be deployed broadly.

Batteries employ a Faradaic energy storage mechanism employing a chemical change in oxidation state of the electroactive material via electron transfer at the atomic or molecular level. This mechanism is relatively slow, which limits the power density of the batteries, and further creates stresses that limit cycle-life. Capacitors employ a non-Faradaic mechanism in which energy is stored electrostatically. In this case, there is no change in oxidation state (i.e., no electron transfer at atomic or molecular level). Compared to Faradic processes, non-Faradic processes are very fast, which allows for high power density, and they create little stress in the electroactive materials, which leads to very high cycle-life Ultracapacitors are EES devices that have the ability to store unusually large amounts of charge compared to comparably-sized capacitors of other types, such as ceramic capacitors, glass capacitors, electrolytic capacitors, etc. For example, an ultracapacitor having the same dimensions as a D-cell battery is capable of storing hundreds of farads (F) of charge. In contrast, an electrolytic capacitor having the same dimensions will typically store a few tens of millifarads (mF) of charge. Thus, ultracapacitors hold promise for storing electrical energy at high power densities, high charge, and high discharge rates for a variety of applications including electric vehicles, hybrid-electric vehicles, industrial equipment, electrical grid load-leveling, and power tools.

While the term ultracapacitor is widely used, those skilled in the art will recognize that term does not have a precise definition and has been used differently by various experts in the field. As used herein, the term ultracapacitor shall refer to an EES device that stores a substantial portion of its charge (greater than about 10%) via formation of electrical double layers at the interface between an electrode coating and a liquid or gel electrolyte. Those skilled in the art will recognize that a variety of names are used for such devices, including electric double-layer capacitors (EDLCs), ultracapacitors, supercapacitors, pseudocapacitors, asymmetric ultracapacitors, hybrid ultracapacitors, battery-ultracapacitor hybrids, and the like. As used herein, the term conventional ultracapacitor shall refer to an EES device that relies predominantly on electrical double layer at two electrodes for charge storage.

Conventional ultracapacitors have energy densities in the range of only from about 1 to about 10 Whr/kg (watt·hours per kilogram) in contrast to secondary cell batteries which have energy densities of from about 10 to 200 Whr/kg. On the other hand, the power density (being a measure of how quickly the energy may be released) for an ultracapacitor is 10 times higher than that of a secondary cell battery or about 1000-5000 W/kg (watts per kilogram).

The high capacitance of a conventional ultracapacitor is obtained by the creation of an electric double layer at the electrode/electrolyte interface in which charges are separated by a distance of a few angstroms. For example, at the anode, negative charge builds on the surface of the electrode, with the electrolyte having a corresponding positive charge at the anode surface. Inversely, at the cathode, positive charge builds on the surface of the electrode, with the electrolyte having a corresponding negative charge. The anode and cathode are separated by a porous separator to give a physical separation to the electrodes, thus preventing short-circuiting, while allowing for the electrolyte to migrate between electrodes and maintain charge balance. The layers of charge at the two electrodes lead to the characterization of conventional ultracapacitors as "electric double-layer capacitors." The high capacitance of an ultracapacitor arises from the large surface area of the electrode coating coupled with the very small distance (typically several angstroms) between opposing charges in the double layers. In comparison to batteries, ultracapacitors provide higher power density, faster charge-discharge cycles, and longer cycle life. However, ultracapacitors have lower energy density and they tend to be more costly.

FIG. 1 is an illustration of a conventional ultracapacitor 100 having electric double layers. The ultracapacitor 100 includes a cathode 110 and an anode 120 isolated from one another by a porous separator 130. The separator 130 also divides the ultracapacitor cell into a cathode compartment with electrolyte 140 and an anode compartment with electrolyte 150. The electric double layers 160, 170 form at the cathode surface as a cathodic double layer 160 and at the anode surface as an anodic double layer 170. However, as outlined above, such ultracapacitors have limitations.

SUMMARY

In one aspect, an EES device is provided which includes a first electrode; a second electrode; an electrolyte; and a separator. According to one embodiment, the separator is an electronic insulator. In another embodiment, the separator is positioned between the first and second electrodes, the separator including a first surface proximal to the first electrode and a second surface proximal to the second electrode. The separator may be configured to support an electric double layer at the first surface, the second surface, or at both the first surface and the second surface. In some embodiments, the separator includes a substance with a high dielectric constant. In some embodiments, the dielectric constant is greater than 10. In other embodiments, the dielectric constant is greater than 100. In one embodiment, the dielectric constant is about 1200. In some embodiments, the separator is an electroactive separator. The EES devices, in some embodiments, are termed "high energy ultracapacitors."

In some embodiments the separator is non-porous. In some embodiments, the separator is minimally porous. In other embodiments, the separator is porous.

In one embodiment, the separator includes a composite of a particulate material in a polymer matrix; or a composite of a particulate material in a glass matrix. In other embodiments, the separator includes a composite of a plurality of ceramic particles in a polymer matrix; a plurality agglomerated ceramic particles in a polymer matrix; a plurality of aggregated ceramic particles in a polymer matrix; or a combination of any two or more such materials. As used herein, the term "agglomerated" refers to a group of individual ceramic particles that have clustered together to form larger particles where the individual particles are not fused together, and the term "aggregated" has a similar meaning except that the individual particles are fused together. In one embodiment, the separator includes a composite of a plurality of ceramic particles in a glass matrix; a plurality agglomerated ceramic particles in a glass matrix; a plurality of aggregated ceramic particles in a glass matrix; or a combination of any two or more such materials. In one embodiment, the separator is a polymer membrane. In one embodiment, the separator is a sintered ceramic. In one embodiment, the separator is a ceramic wafer. In various embodiments, the device is an ultracapacitor, a pseudocapacitor, a battery, an ultracapacitor-battery hybrid, or a pseudocapacitor-battery hybrid.

In some embodiments, the separator includes a ferroelectric material. In some embodiments, the ferroelectric material includes, but is not limited to, $BaTiO_3$, $PbTiO_3$, $PbZr_xTi_{1-x}O_3$, $(Pb_{1-x}La_x)(Zr_{1-y}Ti_y)_{1-0.25x}O_3$, $Pb(Mg_{1/3}Nb_{2/3})O_3$, $PbNb_2O_6$, $PbBi_2Nb_2O_9$, $LiNbO_3$, $LiTaO_3$, $K_xNa_{1-x}NbO_3$, $KTa_xNb_{1-x}O_3$, $KH_2PO_4$, $NaKC_4H_4O_6 \cdot 4H_2O$, $(NH_2CH_2COOH)_3H_2SO_4$, and polyvinylidene fluoride, where x is from 0 to 1 and y is from 0 to 1. In one embodiment, the ferroelectric material includes $BaTiO_3$.

In some embodiments, the separator includes an anti-ferroelectric material. In some embodiments, the anti-ferroelectric material includes $PbZrO_3$, $LuFe_2O_4$, $Pb_5Al_3F_{19}$, $Sr_{0.9-x}Ba_{0.1}Ca_xTiO_3$, and $(Pb_{1-x}Bi_x)Fe_{1+y}O_{3-z}$, where x is from 0 to 1, y is from 0 to 0.1 and z is from 0 to 0.5.

In some embodiments, the separator includes ceramic particles in a polymer matrix, and particles have an average size from about 1 nm to about 100 µm. In some embodiments, the particles have an average size of less than 250 nm.

In some embodiments, the electroactive separator includes a plurality of ceramic particles in a polymer matrix, and the polymer includes polyvinylidene fluoride (PVDF), polytetrafluoroethylene (PTFE), polyvinyl butyral (PVB), polyvinyl chloride, polyethyleneimine, methyl cellulose, ethyl cellulose, polymethyl methacrylate, co-polymers of any two or more such polymers, or blends of any two or more such polymers.

In another aspect, a device is provided which includes a first electrode, a second electrode, a separator that includes a ferroelectric or anti-ferroelectric material, and an electrolyte.

In another aspect, a device is provided that includes non-porous separator, the separator including a plurality of ceramic particles in a polymer matrix, and where the device is an ultracapacitor. In some embodiments, the plurality of ceramic particles have a dielectric constant of greater than 10. In some embodiments, the plurality of ceramic nanoparticles include barium titanate. In some embodiments, the plurality of ceramic nanoparticles have an average size of less than 250 nm. In some embodiments, the plurality of ceramic nanoparticles have an average size of less than 100 nm. In some embodiments, a ratio of ceramic:polymer in the composite is from about 1:2 to about 99:1 on a weight basis.

In another aspect, a method of storing electrical energy is provided including applying an electric potential across the first and second electrodes of any of the above devices.

DETAILED DESCRIPTION

In the following detailed description, reference is made to the accompanying drawings, which form a part thereof. The illustrative embodiments described in the detailed description, drawings and claims are not meant to be limiting. Other embodiments may be utilized, and other changes may be made, without departing from the spirit or scope of the subject matter presented here. The present technology is also illustrated by the examples herein, which should not be construed as limiting in any way.

Provided herein are materials and constructs for forming EES devices, which include high-energy ultracapacitors, that differ in structure and observed properties from conventional ultracapacitors. The high-energy ultracapacitors described herein provide for higher capacitance and operating voltages than conventional ultracapacitors. Because stored energy is related to both capacitance and voltage ($E=\frac{1}{2}CV^2$), the high-energy ultracapacitors provide substantially more energy storage than the conventional ultracapacitors.

The higher capacitance, voltage, and energy storage in the high-energy ultracapacitors is provided for by use of an electroactive separator, which increases the number of electric double layers as are formed in conventional ultracapacitors, and by separation of the electrolyte into two chambers. As used herein, the term "electroactive separator" refers to an electronic insulator that exhibits the formation of electric double layers at least one surface in response to the application of an external electric field. Those with ordinary skill in the art understand that electrical conductivity ($\sigma_T$) results from the movement of charge carriers through a substance, and that the charge carriers may be electronic carriers which give rise to electronic conductivity ($\sigma_e$), ionic carriers which give rise to ionic conductivity ($\sigma_i$), or a combination of electronic and ionic charge carriers such that electrical conductivity is the sum of the electronic and ionic conductivity ($\sigma_T=\sigma_e+\sigma_i$). In a general sense, an electronic insulator is a substance that resists the flow of electronic charge carriers (electrons and electron holes). As used herein, the term "electronic insulator" is a substance that has an electrical resistivity ($\rho_T$, where $\rho_T=1/\sigma_T$) greater than $10^5 \Omega \cdot m$ (ohm-meters), or a substance wherein ionic charge carriers predominate ($\sigma_i > \sigma_e$) and the electronic resistivity ($\rho_e$, where $\rho_e=1/\sigma_e$) is greater than $10^5 \Omega \cdot m$.

Figure 1:
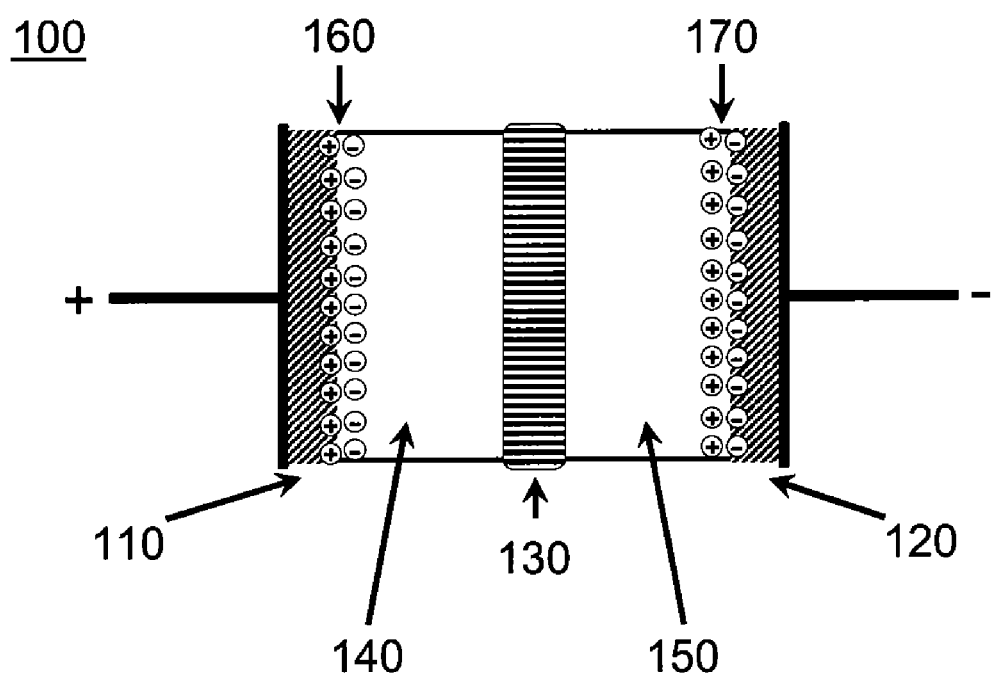
FIG. 1 is a schematic representation of a conventional ultracapacitor.
Figure 2:
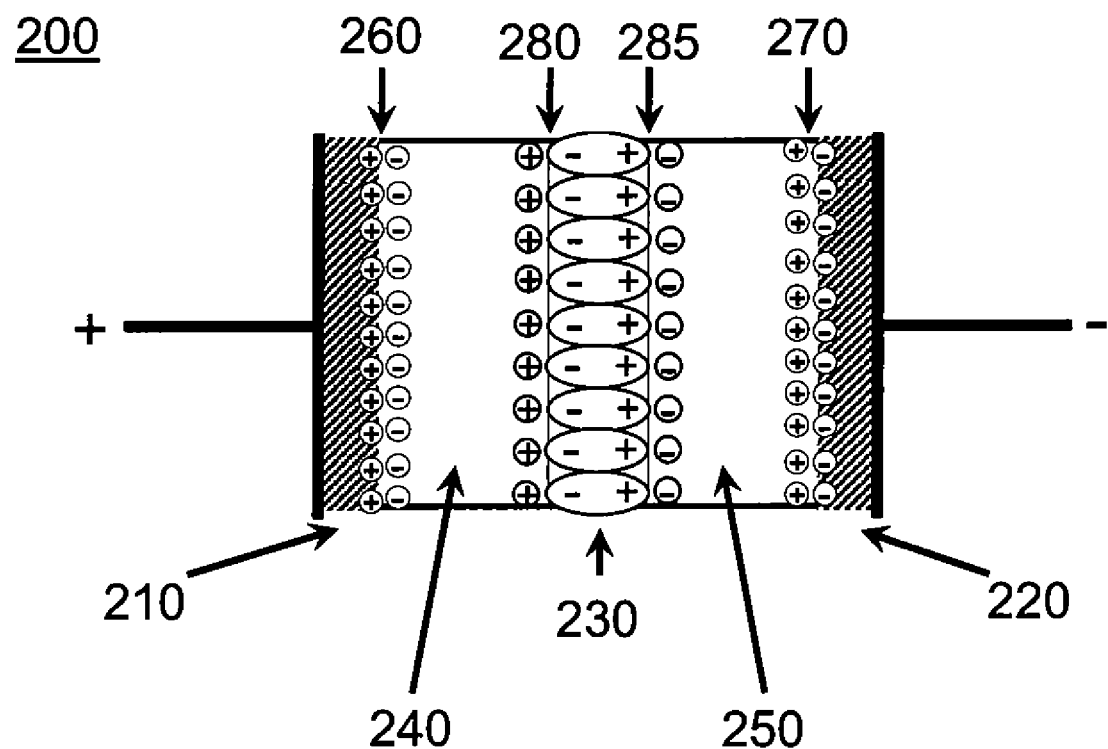
FIG. 2 is a schematic representation of an ultracapacitor which incorporates an electroactive separator as described herein, according to one embodiment.

An ultracapacitor that uses the separator is illustrated in FIG. 2. The high-energy ultracapacitors 200 have a first electrode 210 and a second electrode 220 isolated from one another by a separator 230. For the purposes of illustration only, the first electrode 210 is a cathode, i.e. positively charged electrode, and the second electrode 220 is an anode, i.e. a negatively charged electrode. The separator 230 divides the ultracapacitor 200 into a cathodic compartment 240 having an electrolyte, and an anodic compartment 250 having an electrolyte. As illustrated in FIG. 2, positive charge builds on the surface of the first electrode 210 thereby forming an electric double layer 260 with the electrolyte ions, and a negative charge builds on the surface of the second electrode 220, thereby forming an electric double layer 270 with the electrolyte ions. The electric field causes polarization of the separator 230, which results in the formation of electric double layers 280 and 285, which build on the first electrode side surface and the second electrode side surface, respectively, of the separator 230. Thus, double the number of electric double layers are formed in comparison to the conventional ultracapacitors described by FIG. 1. Accordingly, in one embodiment, the separator 230 includes a first surface proximal to the first electrode 210 and a second surface proximal to the second electrode 220 and the separator 230 is configured to support an electric double layer at the first surface 280 and an electric double layer at the second surface 285. Unlike conventional separators that maintain charge balance via ion migration across a porous separator, the separator 230 uses these additional double-layers to maintain charge balance. As a consequence, the separator 230 can be either porous or non-porous.

In some embodiments, the separator 230 is an insulating separator, or in other words, the separator is an electronic insulator, as defined above. In other embodiments, the separator 230 is an electroactive separator as defined above. In some other embodiments, the separator 230 is an electroactive, insulating separator.

In some embodiments the electroactive separator is non-porous. In some embodiments, the separator is minimally porous. In other embodiments, the electroactive separator is porous. As used herein, the term non-porous means that the separator has less than about 5% porosity, the term minimally porous means that the separator has between 5% and 20% porosity, and the term porous means that the separator has more than 20% porosity. As used herein, porosity is described in terms of percent porosity (% P), which is calculated as:

$$\% P = \left[1 - \frac{\text{sample weight/sample volume}}{\text{bulk density}}\right] \times 100$$

Accordingly, in some embodiments, the separator has a porosity of about 5% or less. In other embodiments, the separator has a porosity of about 1% or less. In some embodiments, the separator has a porosity of 0%. In yet other embodiments, the separator is minimally porous. In yet some other embodiments, the separator is porous.

Figure 3:
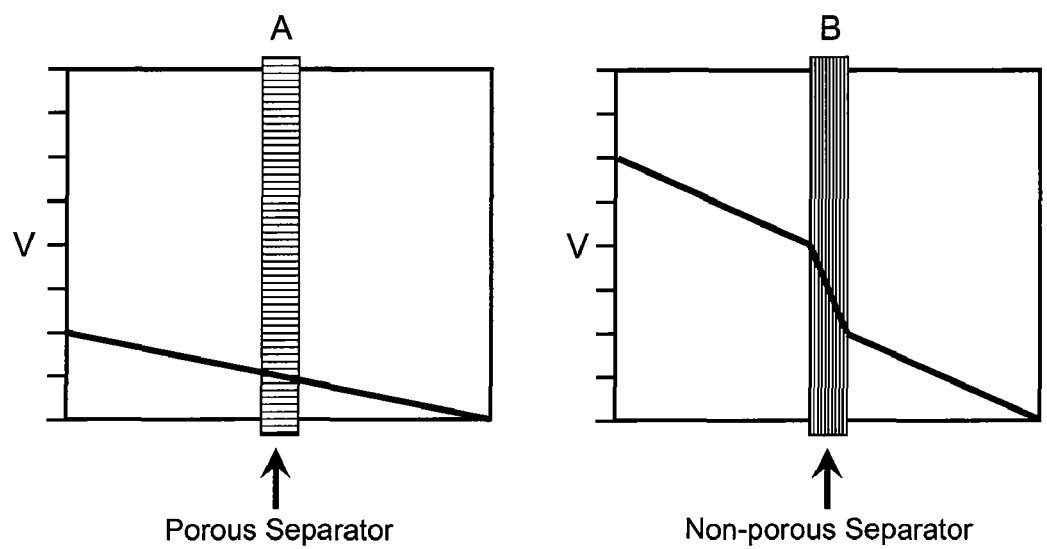
FIGS. 3A and 3B are illustrative representations of the voltage drop across a convention ultracapacitor cell (3A) in comparison to that across a high-energy ultracapacitor, according to one embodiment (3B).

For a conventional ultracapacitor that uses a porous separator, the nominal operating voltage is limited to the breakdown voltage of the electrolyte. However, the operating voltage is increased if the separator is non-porous. In the ideal case of a non-porous separator having 0% porosity, the nominal operating voltage is twice the breakdown voltage of the electrolyte plus the voltage drop across the separator. This is illustrated in FIG. 3. Therefore, in one preferred embodiment, the separator is non-porous. In this case, the thickness and/or composition of the separator can be modified to increase operating voltages. FIGS. 3A and 3B are illustrations of the voltage drop across components of a conventional ultracapacitor (3A) and the present ultracapacitors where the separator is non-porous (3B). Accordingly, in one embodiment, the separator is preferably minimally porous, or non-porous.

In one aspect, an EES is provided and which includes an electroactive separator that includes a polarizable material having a dielectric constant greater than about 10, and which is capable of supporting the double layer formation at the interface between the separator and the electrolyte. Those skilled in the field will recognize that conventional separators are made from polymers having dielectric constants less than 10, and do not support double layer formation at the separator/electrolyte interfaces.

In one embodiment, the separator includes a ferroelectric material. As used herein, the term ferroelectric refers to materials that possess a spontaneous or persistent electric polarization that can be reversed upon application of an external electric field. In one embodiment, the separator has a high dielectric constant and is an anti-ferroelectric material. As use herein, anti-ferromagnetic refers to a material containing an ordered array of electric dipoles where the adjacent dipoles are oriented in opposing directions. Those skilled in the field will recognize that many ferroelectric and anti-ferroelectric materials are polarizable and have very high dielectric constants, which will contribute to significant double layer formation at the separator/electrolyte interfaces.

Illustrative ferroelectric materials include, but are not limited to, $BaTiO_3$ (barium titanate), $PbTiO_3$ (lead titanate), $PbZr_xTi_{1-x}O_3$ (lead zirconium titanate), $(Pb_{1-x}La_x)(Zr_{1-y}Ti_y)_{1-0.25x}O_3$ (lead lanthanum zirconate titanate), $Pb(Mg_{1/3}Nb_{2/3})O_3$ (lead magnesium niobate), $PbNb_2O_6$ (lead niobate), $PbBi_2Nb_2O_9$ (lead bismuth niobate), $LiNbO_3$ (lithium niobate), $LiTaO_3$ (lithium tantalate), $K_xNa_{1-x}NbO_3$ (potassium sodium niobate), $KTa_xNb_{1-x}O_3$ (potassium tantalate niobate), $KH_2PO_4$ (potassium dihydrogen phosphate), $NaKC_4H_4O_6 \cdot 4H_2O$ (potassium sodium tartrate), and $(NH_2CH_2COOH)_3H_2SO_4$ (triglycine sulfate), where x is from 0 to 1 and y is from 0 to 1. In some embodiments, the ferroelectric material may be a polymer. Illustrative ferroelectric polymers include: ferroelectric nylons such as nylon-7, nylon-11, and the like; and PVDF and various co-polymers of PVDF. Illustrative anti-ferroelectric materials include, but are not limited to $PbZrO_3$, $LuFe_2O_4$, $Pb_5Al_3F_{19}$, $Sr_{0.9-x}Ba_{0.1}Ca_xTiO_3$, and $(Pb_{1-x}Bi_x)Fe_{1+y}O_{3-z}$, where x is from 0 to 1, y is from 0 to 0.1 and z is from 0 to 0.5.

The separator may be a ceramic wafer, monolithic ceramic, a sintered ceramic, a glass/ceramic composite, a polymer film, or a polymer/ceramic composite. As used herein, a sintered ceramic refers to a ceramic body that is formed by the fusing together of ceramic particles. The EES device in various embodiments, may also include a cathode, an anode, and an electrolyte. In this context, the terms cathode and anode refer to the positive and negative electrodes, respectively, of a device designed for use in a direct current circuit, or else the two terminals of a device designed for use in a circuit where the polarity of the electrodes changes periodically, such as in an alternating current circuit.

In some embodiments, the particulate material is sintered and is densified to produce a mass having a density greater than 90 percent of the bulk density of the particulate material. As used herein, the term densified means that the density of the sintered object has been increased relative to its initial level. Methods commonly used to densify sintered objects include prolonged heating, application of pressure, and prolonged heating under pressure. Densification decreases the voids in the sintered object and thereby decreases porosity. Therefore, controlling the conditions used to densify a sintered object provides a method for producing an object with a desired porosity. In addition, densification may be used to improve the physical properties of the object such as strength, thermal conductivity, electrical or ionic conductivity, and the like.

Those of ordinary skill in the art will recognize that ceramic wafers, ceramic composites, and polymer films have been used as dielectrics in conventional capacitors. However, conventional capacitors function differently and store much less charge than ultracapacitors. Specifically, conventional capacitors do not store energy via electrical double-layer formation. Additionally, in conventional ultracapacitors, double layer formation is restricted to the electrode/electrolyte interface. The EES device described herein is a type of ultracapacitor that differs from all other capacitors and ultracapacitors in that it contains an electroactive separator that supports double-layer formation at the electrolyte/separator interfaces. Such electroactive separators significantly improve the energy capacity of EES devices.

In one embodiment, the separator includes a composite material. For example, the composite material may include a plurality of ceramic particles in a polymer or a glass matrix. Alternatively, the composite material may include a plurality of ceramic particle agglomerates, aggregates, or combination of agglomerates and aggregates in a polymer or glass matrix. As used herein, the term agglomerate means a group of particles that are not fused together, and aggregate means a group of particles that are fused together.

In such embodiments, the size of the ceramic particles, agglomerates, or agglomerates is limited only by the thickness of the separator. The size of the ceramic particles may range from about 1 nm to about 1000 μm. In some embodiments, the size of the ceramic particles may range from about 1 nm to about 300 nm. In some embodiments, the size of the ceramic particles may range from about 300 nm to about 1000 nm. In some embodiments, the size of the ceramic particles may range from about 1000 nm to about 500 microns. In some embodiments, the particles may be generally referred to as nanoparticles, meaning that they have an average largest dimension of less than 1000 nm.

The ceramic particles preferably have a high dielectric constant. For example, in some embodiments, the ceramic particles have a dielectric constant of greater than 10. In other embodiments, the ceramic particles have a dielectric constant of greater than 100. In other embodiments, the ceramic particles have a dielectric constant of greater than 1000. In other embodiments, the ceramic particles have a dielectric constant from about 100 to about 100,000. In other embodiments, the ceramic particles have a dielectric constant from about 1000 to about 10,000. In other embodiments, the ceramic particles have a dielectric constant from about 100 to about 2,000. In one embodiment, where the ceramic particles are barium titanate particles, the particles have a dielectric constant of about 1,200. In a preferred embodiment, the particles, agglomerates, or aggregates include barium titanate.

Where the separator uses a composite material, a polymer or a glass may be used to bind together a ceramic material. If a polymer is used, the polymer may include, but is not limited to, PVDF, PTFE, PVB, polyvinyl chloride, polyethyleneimine, methyl cellulose, ethyl cellulose, polymethyl methacrylate, co-polymers of these polymer, or blends of any two or more of these polymers. If a glass binder is used, the glass may include, but is not limited to, a silicate glass, such as soda glass, borosilicate glass, lead glass, aluminosilicate glass, and the like; a phosphate glass, such as soda-phosphate; an aluminophosphate glass; a multialkali phosphate glass; or a fluorite glass.

Variations in the ratio (on a weight basis) of polymer to ceramic in the composites results in changes in polymer flexibility, strength, electrical permittivity, and other properties. The ratio of polymer:ceramic may range from about 2:1 to about 1:50. In some embodiments, the ratio is from about 1:2 to about 1:20. In other embodiments, the ratio is from about 1:5 to about 1:15. In yet other embodiments, the ratio is about 1:10.

In another aspect, such electroactive separators are incorporated into an EES device. According to one embodiment, the EES device includes a first and a second electrode (i.e. a cathode and an anode), and an electrolyte, where the cathode and anode are separated by the electroactive separator. According to another embodiment, the EES device includes a cathode, an anode, and an electrolyte, where the cathode and anode are separated by multiple electroactive separators. According to the preferred embodiment, the EES is a type of ultracapacitor or ultracapacitor-battery hybrid.

Materials selected for construction of the electrodes will depend on the type of EES device being constructed and may include any of the electrode coatings that are suitable for such applications. According to one embodiment, the cathode, anode, or both cathode and anode may include, but are not limited to, materials such as carbon, graphite, exfoliated graphite, mesocarbon microbeads (MCMB), graphene, graphene oxide, transition metal oxides, mixed ionic electronic conductors, and carbon nanostructures such as nanotubes, fullerenes, nanocoils, nanoribbons, and the like. According to another embodiment, the anode, cathode, or both the anode and cathode includes one or more lithiated metal compounds, which may include but is not limited to: $Li_{1-x}CoO_2$, $Li_{1-x}NiO_2$, $Li_{1-x}Mn_2O_4$, $Li_{1-x}FePO_4$, $Li_{2-2x'}FePO_4F$, $Li_{4-4x}Ti_5O_{12}$, $Li_{3-3x}V_2(PO_4)_3$, and $Li_{1-x}Fe_2(SO_4)_3 Li_{1-x}TiS_2$ and $Li_{1-x}V_2O_5$, $Li_{1-x}CO_zNi_yMn_{1-z-y}O_2$; and $Li_{1-x}Ni_zCO_{1-z}O_2$, and $Li_{1-x}Fe_{1-z}M_z PO_4$ where M is a metal, x' is from −0.2 to +1, and z is from 0 to 1, and $y+z \leqq 1$. According to some embodiments, M is Co, Mn, or Ni.

The cathode and anode materials may be supported on current collectors, which provide an electrical path from the material that form the cathode or anode, into the circuitry of the electrochemical device and eventual load which is driven by the device. Suitable current collectors include, but are not limited to, copper, aluminum, platinum, palladium, gold, nickel, iron, stainless steel, and graphite.

Suitable electrolytes for use in the EES devices may be liquid, gel, or solid. In one embodiment, the electrolyte is a liquid or gel that includes a solvent and a dissolved salt or acid. Suitable solvents include, but are not limited to, acetonitrile (AN), ethylene carbonate (EC), propylene carbonate (PC), dimethyl carbonate (DMC), diethyl carbonate (DEC), tetrahydrofuran (THF), dimethoxyethane (DME), diethoxyethane (DEE), dioxolane (DN), N-methylpyrrolidone (NMP), γ-butyrolactone (GBL), sulfolane, water, a polysiloxane, or an oligoethyleneoxide substituted organosilicon compound. Suitable salts include, but are not limited to, alkali metal salts, alkaline earth metal salts, ammonium salts, alkylammonium salts, dialkylammonium salts, trialkylammonium salts, and tetraalkylammonium salts. For example, suitable salts include, but are not limited to, $LiClO_4$, $LiBF_4$, $LiAsF_6$, $LiSbF_6$, $LiPF_6$, $LiCF_3SO_3$, $Li(CF_3SO_2)_2N$, $Li(CF_3SO_2)_3C$, $LiC_6F_5SO_3$, $LiAlCl_4$, $LiGaCl_4$, LiSCN, $Li_2O$, $LiCO_2CF_3$, $LiN(SO_2C_2F_5)_2$, $KClO_4$, $NaClO_4$, $KNO_3$, $NaNO_3$, KOH, NaOH, lithium acetate, sodium acetate, potassium acetate, ammonium acetate, tetramethylammonium acetate, and $[NMe_4][BF_4]$. Illustrative acids, may include, but are not limited to, sulfuric, phosphoric, and nitric acid. The concentration of the salt in the solvent of the electrolyte may range from about 0.1 M to about 12 M. In some embodiments, the concentration of the salt in the electrolyte is from about 1 M to about 6 M. In yet other embodiments, the concentration of the salt in the electrolyte is from about 1 M to about 3 M.

The high-energy ultracapacitors described herein are may be used in device applications across a wide variety of size ranges. For example, the devices may be used for energy storage in relatively small devices such as implantable defibrillators, cell phones, cameras, rechargeable flashlights, remote door locking devices, etc. The devices can also be used for energy storage in larger devices such as cordless power tools, electric- and hybrid-electric vehicles, electrical grid or microgrid load-leveling systems, power backup for telecommunication centers, blade pitch control in wind turbines, rubber-tire gantries, electrical utility black-start systems, etc.

In other embodiments, the electrolyte is based upon an ionic liquid, which may or may not also include a salt as described above.

The present technology, thus generally described, will be understood more readily by reference to the following examples, which are provided by way of illustration and is not intended to limit the present technology.

EXAMPLES

Example 1

Constructing an Electroactive Separator

PVDF, barium titanate nanopowder (BT), and NMP were obtained from Sigma-Aldrich and used as received. Nonwoven Kevlar® veil (8 g/m², 0.08 mm thick) was obtained from Fibre Glass Development Corp and cut into 1.9 cm diameter rounds.

The PVDF and BT were combined in a ratio of 1:10 by volume and placed in a mortar and pestle. NMP (10% by volume) was added and the mixture was ground together to produce a thin paint. The mixture was gently brushed onto a 1.9 cm diameter piece of Kevlar® veil. The product was dried at 100° C. to produce a thin disk of a BT/PVDF/Kevlar composite. The disk was sanded using P600 grit wet/dry sandpaper to remove excess BT/PVDF from the surface. The final thickness of the disk was somewhat uneven and measured between 0.1 and 0.2 mm, and the disk weighed about 90 mg. Careful examination of the disk revealed that some pores were present.

Example 2

Constructing an Ultracapacitor

Two 1.9 cm diameter disks were cut from a piece of 0.178 mm thick stainless steel (type 316) shim stock. The disks were sanded with 60 grit emery cloth, washed with deionized water, and dried at 100° C. Vegetable carbon (VC), carbon nanofibers (Pyrograf III), and PVDF were combined in a ratio of 8:1:1 by weight, and then placed in a mortar and pestle. NMP was added to the mortar and pestle and the ingredients were ground together to form a thick suspension. The suspension was then painted onto the stainless steel disks, which were allowed to dry at 100° C. As a result of this treatment, each of the stainless steel disks was coated with a very thin layer containing of VC, which is the electroactive ingredient of the electrode coating mixture. Disks 1 and 2 were coated with 3.7 mg and 2.9 mg of VC, respectively.

One of the electrode disks was placed coating side up in a cell case, and enough electrolyte (2 M $KNO_3$) was added to wet the surface of the disk. The electroactive separator of the BT/PVDF/Kevlar was then placed in the cell case, and it was wetted with electrolyte. Next, the other electrode disk was placed coating side down in the case. Finally, the case was filled with electrolyte and sealed.

Example 3

Testing the Ultracapacitor for Operating Voltage and Energy

Ultracapacitor performance was evaluated using cyclic voltammetry (CV) using a two electrode configuration. CV analysis revealed that the cell could be operated at up to 2.3 volts. The capacitance measured for this device depending on CV scan rate and ranged from 0.1 F (at 100 mV/s) to 1.0 F (at 5 mV/s). Assuming that the energy stored by a capacitor is given by $E=0.5\ CV^2$, this device was capable of storing between 0.26 Joules and 2.6 Joules.

For comparison, we prepared and tested similar conventional ultracapacitors containing a passive separator. These devices had much lower capacitance, typically from about 0.05 F to 0.2 F, depending on scan rates, and could only be operated at up to 1.0 volts. Thus, the energy stored by similar devices with passive separators typically ranged from 0.03 Joules to 0.10 J.

Example 4

Constructing an Electroactive Separator

Figure 4:
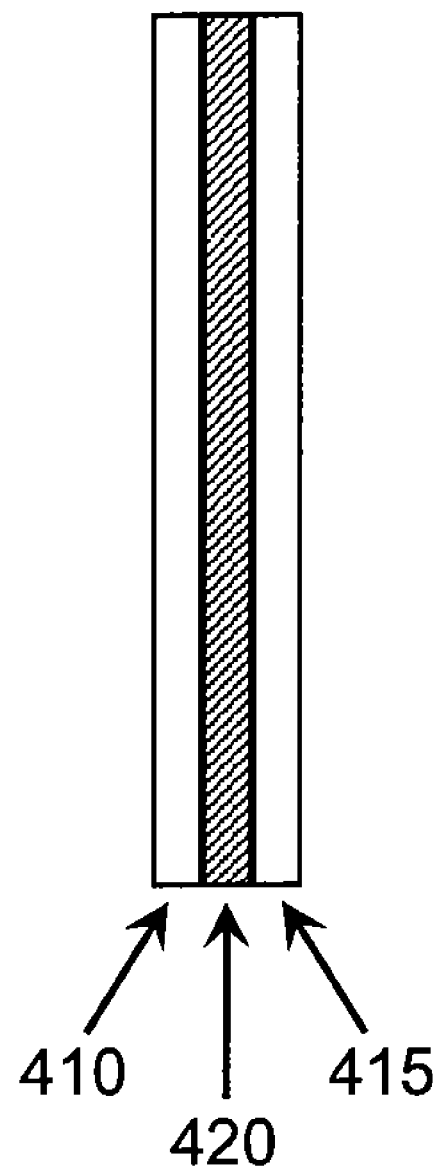
FIG. 4 is a side view illustrating the multilayer paper/separator/paper assembly, as described in Example 4.

A paste was prepared by grinding together 1.80 g BT, 0.21 g PVDF, and sufficient NMP to form a thick paste. A portion of the paste was placed on a piece of Whatman #1 filter paper and rolled with a metal dowel pin to squeeze out excess liquid and form a thin uniform nonporous film. A second piece of Whatman #1 filter paper was placed on top to form a paper/BT composite/paper sandwich, which was allowed to dry at room temperature for 2 hours, followed by drying at 65° C. for two hours. FIG. 4 shows an edge-on illustration of the separator 400, showing the paper outer layers 410 and 415, and the BT composite center 420. After drying, a 19 mm diameter disk was cut from the sandwich.

Example 5

Constructing an Ultracapacitor

Figure 5:
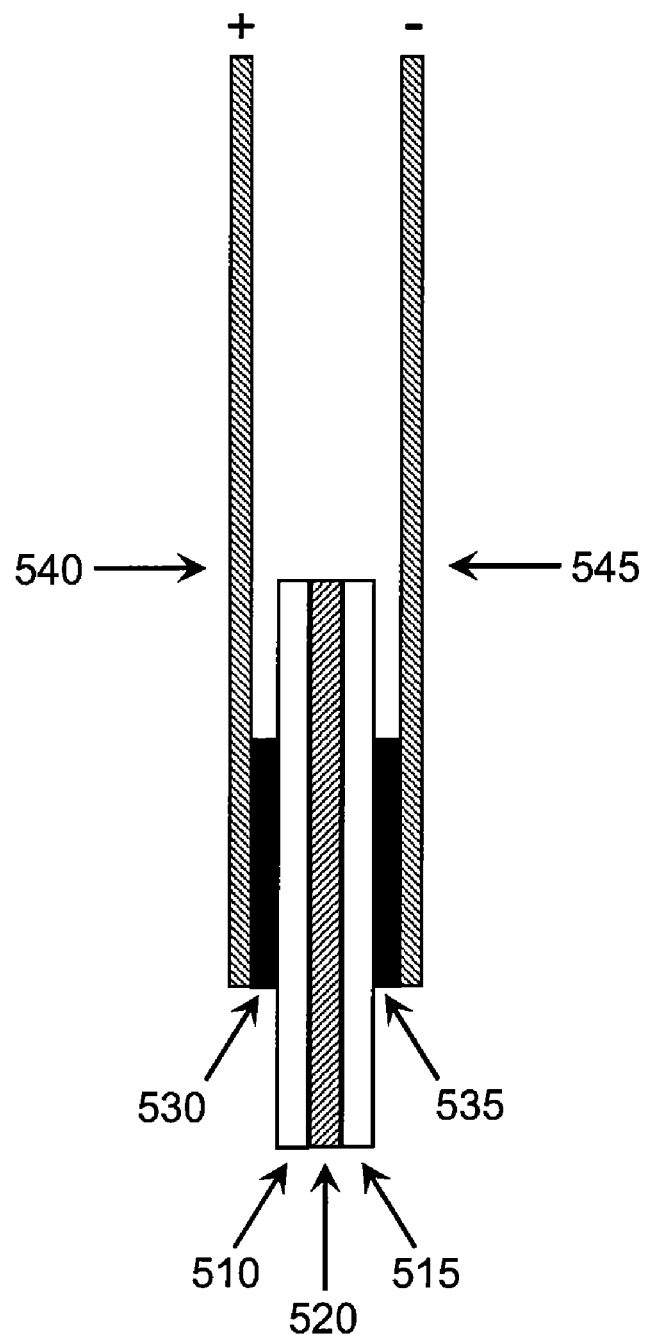
FIG. 5 is a side view illustrating the configuration of an electrode stack, as described in Example 5.
Figure 6:
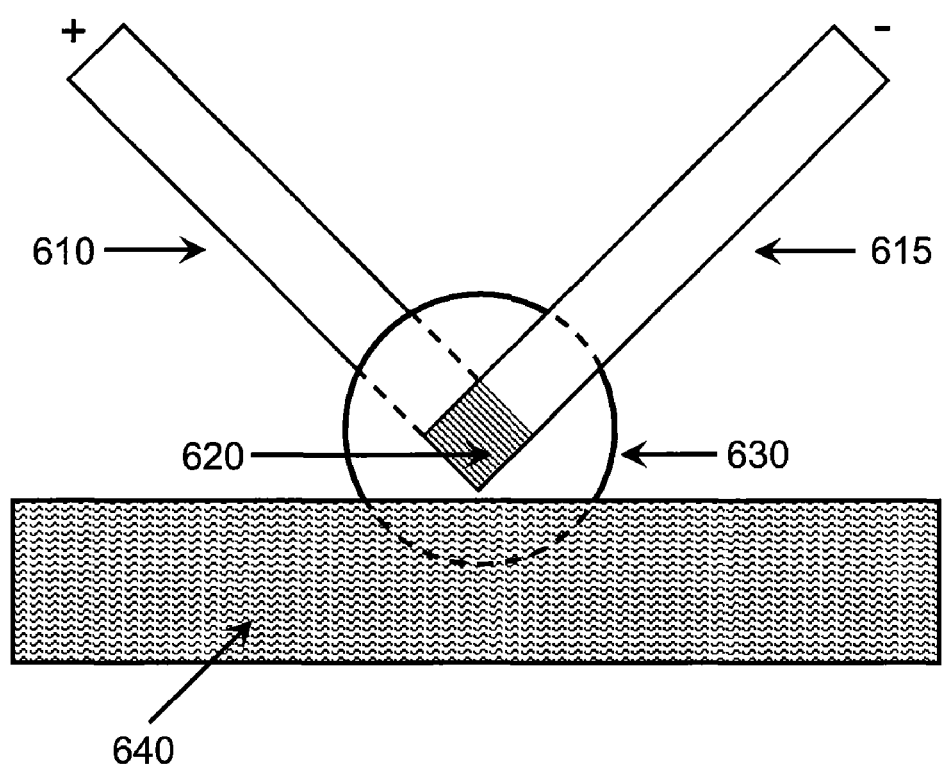
FIG. 6 is a front view illustrating a completed ultracapacitor, as described in Example 6.

Rectangular current collectors measuring 11 mm by 50 mm were cut from platinum foil. Electrode coatings (11 mm×11 mm squares) were cut from 125 micron thick carbon/polymer composite film. A 19 mm diameter paper/BT composite/paper disk was prepared as described above. These components were assembled as shown in FIG. 5 to form an electrode stack. FIG. 5 illustrates an edge-on view of the electrode stack 500, which includes the platinum current collectors (540 and 545), the carbon/polymer composite films (530 and 535), and the paper/BT composite/paper separator (510, 520, and 515, respectively). A wooden clothes pin was used to hold the electrode stack components together. The electrode stack was lowered into a bath of electrolyte (2 M $KNO_3$) so that only the bottom edge of the paper/BT composite/paper sandwich was wet, whereupon the filter paper wicked the electrolyte into the cell. FIG. 6. illustrates a front view of the completed ultracapacitor 600 (without clothes pin), where 610 and 615 represent the current collectors (outer most components of the electrode stack), 630 represents the paper/BT composite/paper sandwich (the innermost component of the electrode stack), 620 represents the carbon/polymer composite (one between the sandwich and each current collector), and 640 represents the electrolyte, which is absorbed by the paper layers of the sandwich.

Example 6

Testing the Ultracapacitor for Operating Voltage and Energy

Figure 7:
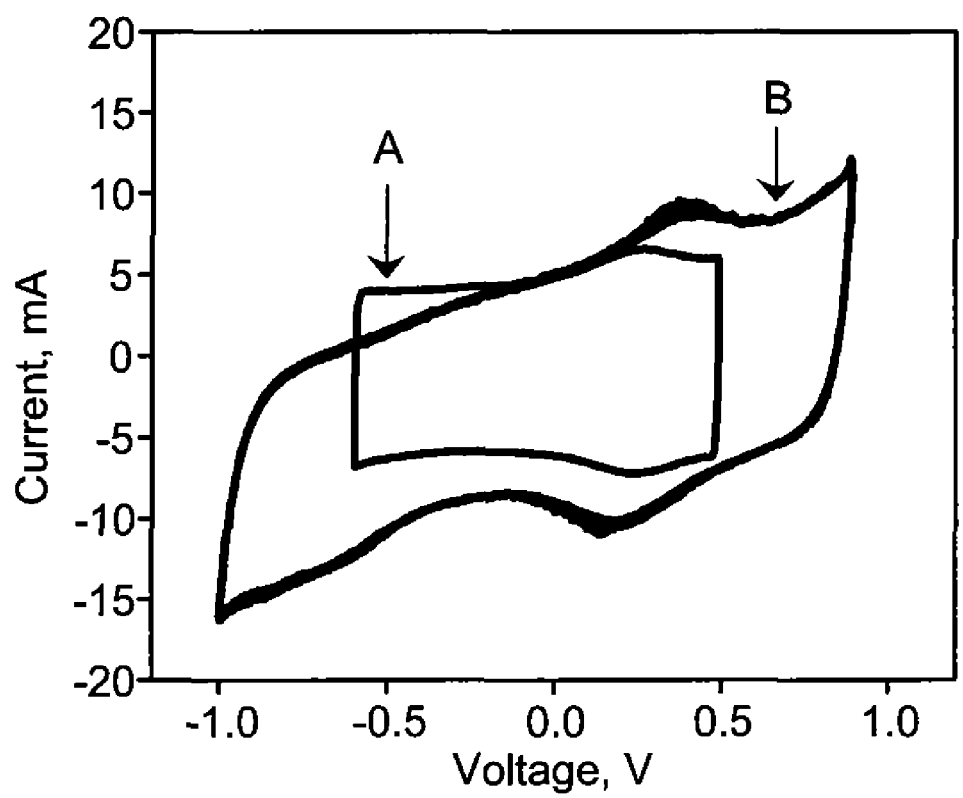
FIGS. 7A and 7B are cyclic voltammograms of a conventional ultracapacitor (4A) and a high-energy ultracapacitor, according to one embodiment described herein (4B), as set forth in Example 3.

Ultracapacitor performance was evaluated using cyclic voltammetry (CV) using a three electrode configuration, with a Ag/AgCl reference electrode. CV analysis revealed that the cell had an operating voltage of 1.9 volts (−1.0 to +0.9V relative to Ag/AgCl) at a scan rate of 5 mV/s. See FIG. 7B. The capacitance measured for this device under these conditions was 3.0 Farads. Assuming that the energy stored by a capacitor is given by $E=0.5\ CV^2$, this device was capable of storing 5.4 Joules.

For comparison, we prepared and tested a conventional ultracapacitor that was identical in all respects, except that paper/BT/paper sandwich was replaced by two 19 mm diameter disks cut from Whatman #1 filter paper. The operating voltage of this device was only 1.1 volts, and its capacitance was only 2.2 Farads. See FIG. 7A. Assuming that the energy stored by a capacitor is given by $E=0.5\ CV^2$, this device was capable of storing 1.3 Joules, which is much lower than the device containing the electroactive separator.

In summary, ultracapacitor prototypes containing the electroactive separator have been developed. These prototypes are symmetric devices that, according to the examples and singular embodiments, use conventional activated carbon as the electroactive coating material, an aqueous electrolyte, and the electroactive separator(s). For comparison, similar devices with conventional separators were also fabricated. It was observed that the use of the electroactive separator increases the capacitance of the cell by as much as 5 times (i.e., 500%). In addition, the use of the electroactive separator allows for an increase the operating voltage (V) of the cell by as much as 2.3 times (i.e., 230%). Because the energy stored by the cell scales as $CV^2$, it has been shown that the use of the electroactive separators increases the volumetric energy density of the cell by a factor of between 4 and 26 (i.e., 400% to 2600%), depending on cell geometry and operating conditions.

While the inventors do not wish to be bound by any particular theory, it is believed that the applied electric field polarizes the barium titanate in the separator, which results in the formation of double-layers of charge at each separator/electrolyte interface. Accordingly it may also be possible to use other materials that can be similarly polarized by an applied electric field. In addition, it is also believed that the high dielectric material of the separator may concentrate the electrical field across the separator preventing electrical breakdown of the electrolyte thereby increasing the operating voltage of the capacitor as well as providing energy storage. Accordingly the use of other high dielectric materials may also be possible. Also, the inventors observe that the electroactive separator functioned when free from visual defects (i.e., non-porous; Example 4) and when some pores were present (Example 1). Accordingly, the inventors believe that separator porosity can be varied, which would alter the operating voltage, device power, and frequency response in AC applications.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, or materials, which can of course vary. It is also to be understood that the terminology used herein is for the purpose of describing particular embodiments only, and is not intended to be limiting.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

While certain embodiments have been illustrated and described, it should be understood that changes and modifications can be made therein in accordance with ordinary skill in the art without departing from the technology in its broader aspects as defined in the following claims.

What is claimed is:

1. A device comprising:
   a first electrode;
   a second electrode;
   a separator; and
   an electrolyte;
   wherein:
   the separator is an electronic insulator comprising a solid material having a dielectric constant greater than 100;
   the separator is positioned between the first and second electrodes;
   the separator comprises a first surface proximal to the first electrode and a second surface proximal to the second electrode;
   the separator is configured to support an electric double layer at the first surface, the second surface, or at both the first surface and the second surface; and
   the device is an electrical energy storage device.

2. The device of claim 1, wherein the separator comprises:
   a composite of a particulate solid material in a polymer matrix; or
   a composite of a particulate solid material in a glass matrix.

3. The device of claim 2, wherein the separator comprises the
   composite of the particulate solid material in a polymer matrix, and the polymer matrix comprises polyvinylidene difluoride, polyvinyl butyral, polytetrafluoroethylene, polyvinyl chloride, polyethyleneimine, methyl cellulose, ethyl cellulose, polymethyl methacrylate, a co-polymer of any two or more thereof, or a blend of any two or more thereof.

4. The device of claim 2, wherein the separator comprises the composite of the particulate solid material in a polymer matrix; and a ratio of particulate material:polymer is from about 1:2 to about 99:1 on a weight basis.

5. The device of claim 1, wherein the solid material comprises: a plurality of ceramic particles or a plurality of sintered ceramic particles.

6. The device of claim 1, wherein the dielectric constant is less than 100,000.

7. The device of claim 1, wherein the solid material is ferroelectric.

8. The device of claim 1, wherein the solid material comprises $BaTiO_3$, $PbTiO_3$, $PbZr_xTi_{1-x}O_3$, $(Pb_{1-x}La_x)(Zr_{1-y}Ti_y)_{1-0.25x}O_3$, $Pb(Mg_{1/3}Nb_{2/3})O_3$, $PbNb_2O_6$, $PbBi_2Nb_2O_9$, $LiNbO_3$, $LiTaO_3$, $K_xNa_{1-x}NbO_3$, $KTa_xNb_{1-x}O_3$, $KH_2PO_4$, $NaKC_4H_4O_6 \cdot 4H_2O$, or $(NH_2CH_2COOH)_3H_2SO_4$ wherein x is from 0 to 1, and y is from 0 to 1.

9. The device of claim 1, wherein the solid material comprises $BaTiO_3$.

10. The device of claim 1, wherein the solid material is anti-ferroelectric.

11. The device of claim 1, wherein the solid material comprises a sintered particulate material.

12. The device of claim 1, where the separator has less than 5% porosity.

13. The device of claim 1, wherein the separator is non-porous.

14. The device of claim 1, wherein the electrical storage device is an ultracapacitor, a pseudocapacitor, a battery, an ultracapacitor-battery hybrid, or a psuedocapacitor-battery hybrid.

15. The device of claim 1 which is an ultracapacitor.

16. A method of storing electrical energy comprising:
   applying an electric potential across the first and second electrodes of the device of claim 1.

17. The device of claim 1, wherein the separator is porous.

* * * * *